UNITED STATES PATENT OFFICE.

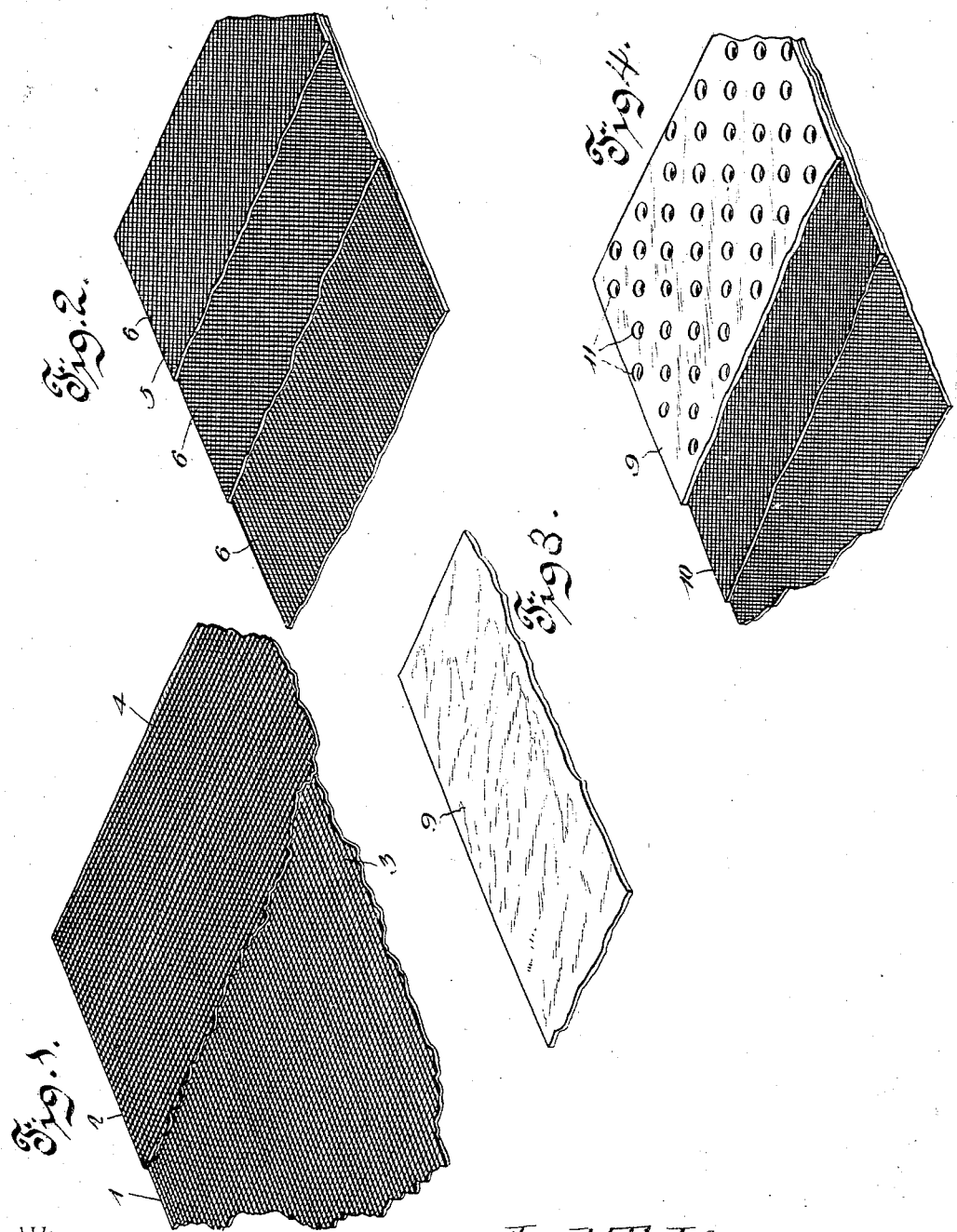

JACOB T. JOHNSON, OF KNOXVILLE, TENNESSEE.

COMBINED OR LAMINATED MATERIAL.

SPECIFICATION forming part of Letters Patent No. 696,567, dated April 1, 1902.

Application filed October 30, 1899. Serial No. 735,257. (No specimens.)

*To all whom it may concern:*

Be it known that I, JACOB T. JOHNSON, a citizen of the United States, residing at Knoxville, in the county of Knox and State of Tennessee, have invented certain new and useful Improvements in Combined or Laminated Material, of which the following is a specification.

This invention relates to a yielding combination or laminated material; and the object of the same is to construct an appropriate material or article of manufacture for chair seats and backs or other uses, the said material consisting of a body layer or laminæ of suitably-woven textile fabric, the strain or warp-threads of each layer or lamina running at an angle differing from those in each adjacent layer, thus producing a strong flexible supporting-body with the lines of strain running in different directions, and to a surface of said supporting-body so constructed is cemented, woven, or otherwise fastened a layer or lamina of pure or other grade of rubber, rubber compound, plush, pantasote, felt, leatherette, leather, or other suitable soft or yielding material.

A further object of my invention is to manufacture a goods suitable for the purposes hereinbefore mentioned and which will be noiseless, durable, pleasing, and inexpensive.

My invention finally consists in the novel combination and arrangement of parts hereinafter more fully described, and particularly pointed out in the claims.

In describing my invention in detail reference is had to the accompanying drawings, forming a part of the specification, wherein like numerals of reference indicate corresponding parts throughout the several views thereof, and in which—

Figure 1 is a perspective view of two pieces of fabric, showing the strain or warp-threads running at right angles. Fig. 2 is a similar view of three pieces of fabric crossing each other, showing the strain or warp-threads arranged in different angles. Fig. 3 is a perspective view of a piece of pure rubber, rubber compound, plush, pantasote, leather, leatherette, felt, or other soft or yielding material. Fig. 4 is a perspective view of the completed article or fabric with the finish layer of rubber, rubber compound, plush, pantasote, leather, leatherette, felt, or other analogous material plainly in view.

Similar numerals of reference are employed to indicate corresponding parts in the several views.

Referring to the drawings, the numerals 1 and 2 designate layers of my improved combination goods or fabric having the strain or warp-threads 3 and woof-threads 4 running lengthwise and crosswise of the same at angles to each other.

5 indicates two or more layers of my fabric, producing a strong supporting-body with the lines of strain or warp-threads, as at 6, running in different directions aside from a right angle, the woof-threads being in an angular relation to the warp-threads similarly to the said threads 4, heretofore referred to.

9 indicates a layer of pure or other grade of rubber, rubber compound, plush, pantasote, leatherette, felt, leather, or other analogous material to be used as a finish layer to my improved combination goods or fabric.

10 indicates two or more layers after they have been cemented, woven, or otherwise secured together, producing a strong supporting-body, showing the finish layer 9 therewith, and 11 indicates one or more holes which may, if desired, be punched in the finished product upon being used for chair seats and backs or for other purposes.

The method which I employ in the manufacture of my improved goods or fabric is to preferably take two or more separate layers or laminæ and cement or otherwise fasten them securely together in the form hereinbefore described, and shown in the drawings, or to manufacture a combination goods or fabric such that when it comes from the loom or factory it will present a strong solid body consisting of layers, as hereinbefore described, or the layers or laminæ of fabric may be woven or manufactured and joined separately and the finish layer afterward applied, the compound material thus made being strong, soft, yet only slightly yielding to weight.

It will be apparent that my new improved goods may be employed and used with advantage for various purposes, and it is so intended.

I am aware that various kinds of laminated bodies have been employed in the manufacture of chair seats and backs and for other purposes; but so far as can be ascertained my improved fabric or goods is the only laminated supporting-body consisting of two or more layers of woven fabric with the lines of strain arranged in different directions for the purpose of checking the elasticity of the individual layers and to one side only of which laminated supporting-body there is applied a layer of rubber, rubber compound, plush, pantasote, leather, leatherette, felt, or analogous yielding material.

It is thought that the many advantages of my new improved combination goods can be readily understood from the foregoing description, taken in connection with the accompanying drawings.

After the fabric or goods is entirely completed the finished surface may be stained or otherwise colored as may be desired. Furthermore, the said finished surface may be embossed with or without coloring or staining the same or otherwise ornamenting. The woof of the layers of fabric is indestructible and of a strong and regular nature, being in close relation to the warp-threads, and the latter also regular in their arrangement.

It will be noted that various changes may be made in the details of construction without departing from the spirit of my invention.

Having thus described the invention, what is claimed as new is—

1. As an improved article of manufacture, a laminated body consisting of two or more layers of woven fabric permanently secured together, the warp-threads or lines of strain of each layer being disposed at an angle to the warp-threads or lines of strain of each adjacent layer, whereby each layer is made to check the elasticity of the other, and a top finish or layer of yielding material of a character different from that of the body, substantially as and for the purpose specified.

2. As an improved article of manufacture a combination material in flexible sheet form and consisting of a laminated body composed exclusively of two or more layers of textile fabric of a continuous or unbroken weave and similar in dimension, the said layers having both the warp and woof threads constantly remaining in close-woven arrangement and the warp-threads of each layer at an angle to those of the adjacent layer or layers, whereby each layer checks the elasticity of each adjacent layer and the entire laminated structure prevented from drawing in any direction, and a thin layer of yielding material secured to one side only of the body, the entire combination material being apertured at regular intervals.

In testimony that I claim the foregoing as my own I have hereto affixed my signature in the presence of two witnesses.

JACOB T. JOHNSON.

Witnesses:
   D. E. SQUIRES,
   W. PERRY HAHN.